307-425 EX

XR 3,621,306

[redacted]

[11] 3,621,306

[72] Inventor Gerhard Schickle
Backnang Wurttemberg, Germany
[21] Appl. No. 761,684
[22] Filed Sept. 23, 1968
[45] Patented Nov. 16, 1971
[73] Assignee Telefunken Patentverwertungsgesellschaft GmbH
Ulm am Danube, Germany
[32] Priority Sept. 29, 1967
[33] Germany
[31] P 15 91 725.6

[54] CONTROLLED GUNN-EFFECT DEVICE
2 Claims, 9 Drawing Figs.

[52] U.S. Cl. ........................................................ 307/299,
307/88.3, 307/218, 307/260, 317/234 V, 330/5, 330/34, 331/107 G, 333/29
[51] Int. Cl. ........................................................ H03k 19/24
[50] Field of Search ........................................................ 325/234 (10); 331/107 (6); 307/299

[56] References Cited

UNITED STATES PATENTS

| | | | |
|---|---|---|---|
| 3,365,583 | 1/1968 | Gunn | 317/234 |
| 3,377,566 | 4/1968 | Lanza | 317/234 |

OTHER REFERENCES

Bell Laboratories Record, " Bulk Effect Devices for Future Transmission Systems" Engelbrecht June 1967, pages 192–197

*Primary Examiner*—Roy Lake
*Assistant Examiner*—Darwin R. Hostetter
*Attorney*—Spencer & Kaye

ABSTRACT: A Gunn-effect device in which the active layer of the semiconductor body is provided with a suitable recess, hole or opening which extends through the active layer and which directly or indirectly affects the high electric field zone in the crystal.

3621306
OR IN 307/299

INVENTOR
Gerhard Schickle

BY Spencer & Kaye
ATTORNEYS

INVENTOR
Gerhard Schickle

BY Spencer & Kaye
ATTORNEYS

INVENTOR
Gerhard Schickle

BY Spencer & Kaye
ATTORNEYS

*INVENTOR*
Gerhard Schickle

BY Spencer & Kaye

*ATTORNEYS.*

CONTROLLED GUNN-EFFECT DEVICE

BACKGROUND OF THE INVENTION

The present invention relates to a semiconductor device which produces electromagnetic oscillations and which consists of a monocrystalline semiconductor body of predetermined dimensions, preferably a III—V—semiconductor crystal, When there is applied across this crystal an electric field whose strength exceeds a critical value, a negative resistance is formed within the semiconductor body due to the high electric field zone which builds up in the crystal and which preferably propagates through the crystal. This effect has become known as the Gunn-effect, and is used for the generation of electromagnetic oscillations. This discovery is described by J. B. Gunn in an article entitled "Microwave Oscillations of Current in III–V–Semiconductors" appearing on pages 88 to 91 of *Solid State Communications*, No. 1, 1963.

More particularly, the Gunn-effect is utilized in oscillators and amplifiers designed to operate in the upper GHz range. The first Gunn-effect device consisted of a crystal in the form of an active layer of N-type gallium-arsenide. The frequency of the oscillation was dependent only on the thickness of the active layer between the electrodes which were conductively connected with the semiconductor and which produced the necessary electrical field (about 3,000 V/cm.)

According to recent developments, the semiconductor body was so doped and operated that the frequency of the oscillations no longer depended on the distance between the electrodes, so that still higher frequencies could be obtained, or so that, by providing thicker crystal layers, the device could be operated at higher power. This method is known as the LSA mode, an abbreviation derived from "limited space-charge accumulation."

According to another development, the negative resistance obtained from the Gunn-effect was controlled by means of at least one control electrode arranged at the surface of the active layer, this control electrode having an appropriate control voltage applied to it.

It has also been found that the wave shape of the current flowing through the external circuit of the device could be influenced by bevelling or slotting the edge of the semiconductor body.

The above notwithstanding, the use to which known Gunn-effect devices can be put is limited by various factors inherent in the design and operation of such devices, and it is, therefore, the primary object of the present invention to provide a way in which to make it possible to use a Gunn-effect device in further fields of application, namely, to provide a further way in which to control the negative resistance formed in the crystal and thereby the microwave oscillations.

BRIEF DESCRIPTION OF THE INVENTION

In accordance with the present invention, the above object is achieved by providing the active layer of a Gunn-effect device with at least one recess which influences the direct current electric field zone. This recess preferably extends at right angles to the direction of drift of charge carriers in the active layer.

DESCRIPTION OF THE PREFERRED EMBODIMENTS

Figure 1A:
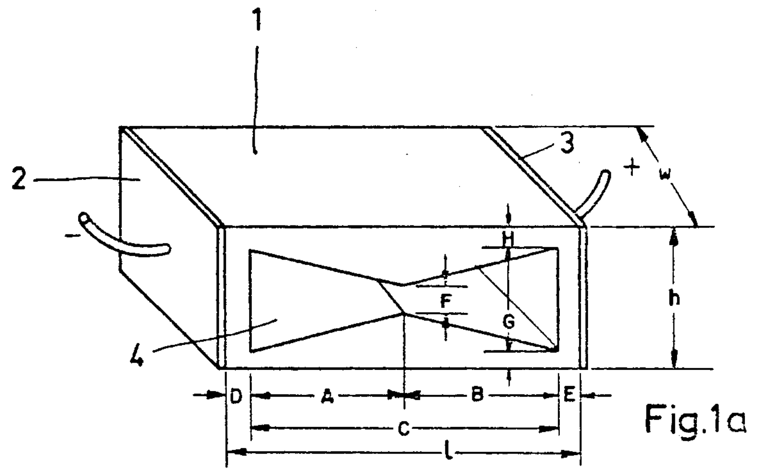
FIG. 1*a* is a perspective view of one embodiment of a Gunn-effect device according to the present invention.
Figure 1B:
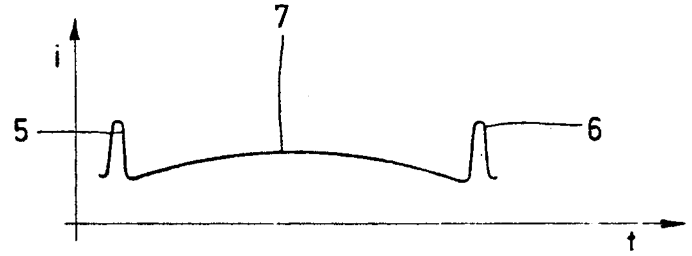
FIG. 1*b* is a current/time plot showing the wave shape of a current flowing in the external circuit connected to the Gunn-effect device shown in FIG. 1*a*.

Referring now to the drawings and first to FIG. 1*a*, the same shows a Gunn-effect device having a block-shaped semiconductor body 1 and two electrodes 2 and 3 which are in surface-to-surface ohmic contact with opposite sides of the semiconductor body 1. When a suitable electric field is applied across the body 1, a differential resistance is produced in the body 1 due to the buildup of a so-called high electric field zone which propagates preferably entirely through the semiconductor body and which, when it arrives at the anode 3, produces a current pulse 6 in the external circuit connected to the device, as shown in FIG. 1*b* on current axis *i*. If the applied field strength is above the critical field strength needed to trigger oscillations, the process is repeated. In FIG. 1*b*, it was assumed that the device was not being operated in the above-mentioned LSA mode, so that the output pulses 5 and 6, which schematically represent the microwave oscillations, are spaced from each other, on the time axis *t*, a distance that corresponds to the time it takes for the high field zone to traverse the semiconductor body 1.

According to the present invention, the semiconductor body 1 is provided with a recess, i.e., hole which influences the oscillation that is being generated. This influence which the recess 4 has on the oscillation is shown by the distortion of the current, shown in FIG. 1*b* at 7. In the illustrated embodiment, the recess is arranged at right angles to the direction of drift and parallel to the two electrodes 2 and 3. By so positioning the recess, pulses or particular current shapes can be obtained by appropriately selecting the cross section of the recess and the location of the recess. One field of application of an oscillator incorporating such a Gunn-effect device is to identify a number of objects flying at high speeds, since the large variety of possible pulse shapes makes it readily possible to distinguish between the different objects.

The embodiment shown in FIG. 1 can be modified in that the semiconductor body need not have a constant cross section. Instead, the cross section of the body, preferably the cross section between the anode and cathode, can vary, either constantly or in a stepwise manner. One practical variation is to increase the effective cross section, taking the recess into consideration, in the direction of drift of the charge carriers.

As described so far, the size and position of the recess was used so as directly to influence the oscillations. According to a further feature of the present invention, the recess can be used so as indirectly to influence the oscillations. For example, the recess may extend approximately in the direction of drift of the charge carriers and means can be coupled into the recess for influencing the high field zone. These means can be passive and/or active elements.

According to a further feature of the present invention, the oscillations can be controlled by applying a heat field or high frequency field.

According to yet another feature of the present invention, the oscillations can be controlled by means of an electron beam or photon beam which is directed through the recess.

According to yet another feature of the present invention, the recess or only the walls thereof are at least partially contacted, thus giving even greater flexibility insofar as controlling the oscillations is concerned. This contact may be any type of contact, such as an ohmic contact, an insulated contact, or a contact which forms a PN junction. In each case, the contacted recess is used to control the oscillations, and this, in turn, does not depend on the position of the recess.

According to a still further feature of the present invention, the cathode and anode of the device can be constituted by a contacted recess which is connected with a suitable direct current source.

Figure 2:
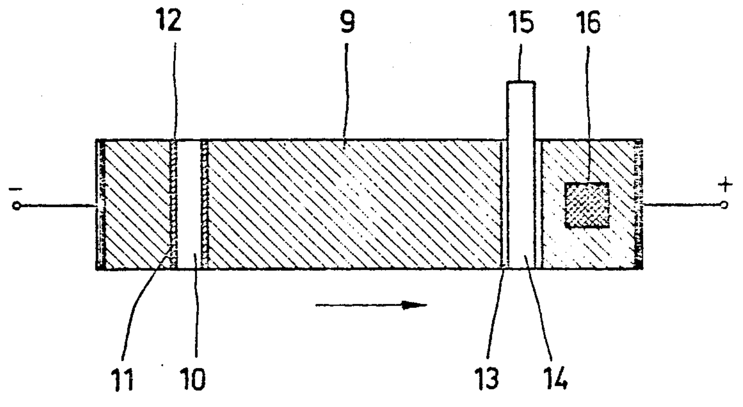
FIG. 2 is a sectional view of another embodiment of a Gunn-effect device according to the present invention, the same incorporating a plurality of recesses.

In the embodiment of FIG. 2, there is shown a semiconductor body 9 which, in the plane of the drawing, has the same dimensions between the cathode and anode. Here, the oscillations are controlled indirectly through the recesses 10, 13 and 16. In order to show the multitudinous variations and modifications to which the present invention is susceptible, the bore 10 is shown as being metallized with a coating 11 which is connected with an external element 12. The bore 10 is shown as being at right angles to the direction of drift which is indicated by the arrow. The recess 13, which is also at right angles to the direction of drift and which is spaced from recess 10, is completely filled by a metal plug 14, the latter being connected to an external element 15. The third recess 16 is shown as being arranged near the metallized end surface of the semiconductor which serves as the anode, this recess being at right angles to the direction of drift and parallel to the anode. The recess is so fashioned that a PN-layer is formed from which can be taken off the rectified voltage which this PN-layer produces.

Depending on what elements are selected to serve as elements 12 and 15–for example, additional voltage sources which can be switched in as desired, resistors, or short circuits, which can be connected in parallel or in series with a part of the semiconductor 9–the wave shape of the current flowing through the external circuit can be varied in an exceedingly large number of different ways (see Engelbrecht in Bell Laboratories Record, June 67, p. 196–197).

Figure 7:
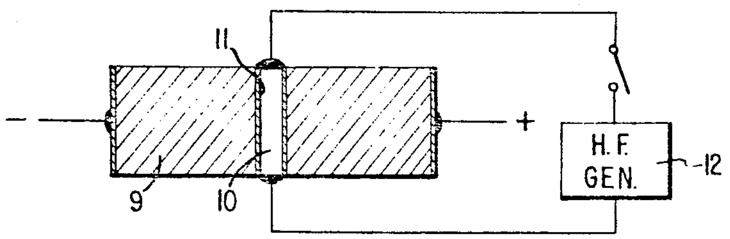
FIGS. 7 and 8 are sectional views of modifications of the invention according to the basic embodiment of FIG. 2 illustrating various arrangements for applying the controlled energy to the device via the hole or recess.
Figure 8:
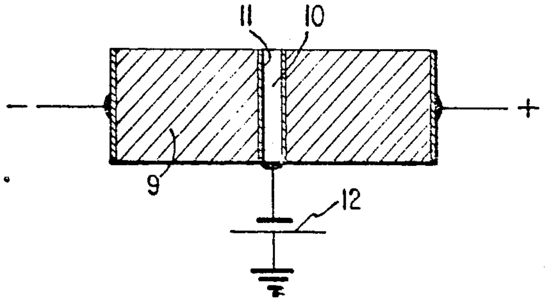

A number of embodiments illustrating the specific manner in which the Gunn-effect device according to the invention as basically illustrated in FIG. 2 may be controlled are shown in FIGS. 7 and 8. According to the embodiment of FIG. 7, the semiconductor body 9 is provided with a bore or hole 10 and indirect control of the oscillations in the Gunn-effect device is provided by means of a high frequency source 12 electrically connected across the contacted bore 10. The high frequency source may be used, for example, to modulate the oscillations of the Gunn-effect device. According to the modifications of FIG. 8, the semiconductor body 9 is provided with a hole 10, the electrical contact 11 of which is connected to a DC source, whereby the contact 11 serves as a cathode for the device.

Figure 3:
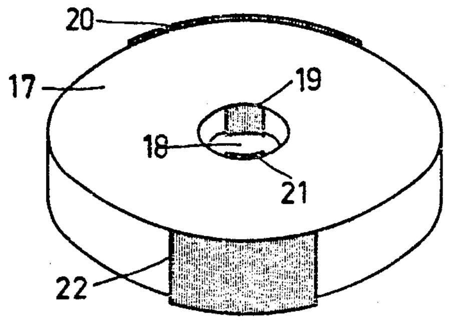
FIG. 3 is a perspective view of yet another embodiment of a Gunn-effect device according to the present invention, the same being disc shaped and having a central recess.

FIG. 3 shows another embodiment of a Gunn-effect device according to the present invention, the same including a disc-shaped semiconductor body 17 having a central bore 18. The wall of this bore is provided with two metal coatings 19 and 21 which are insulated from each other, the outer wall of the disc likewise carrying two metal coatings 20 and 22. Either set of inner and outer coatings can be connected to a suitable voltage source and serve as cathode and anode; in practice, one of the inner coatings, i.e., one of the coatings 19 and 21, will serve as the cathode. By suitably dimensioning the semiconductor body, two oscillations can be obtained simultaneously, or there can be obtained one oscillation and one amplification. It is possible, by differently doping the material between the electrodes, and/or by giving the semiconductor body a noncircular configuration, to obtain different frequencies which mutually modulate each other within a very large frequency spectrum, this mutual influencing taking place either in the semiconductor body itself or in an external component which is connected to the device and which has a nonlinear characteristic.

Figure 4:
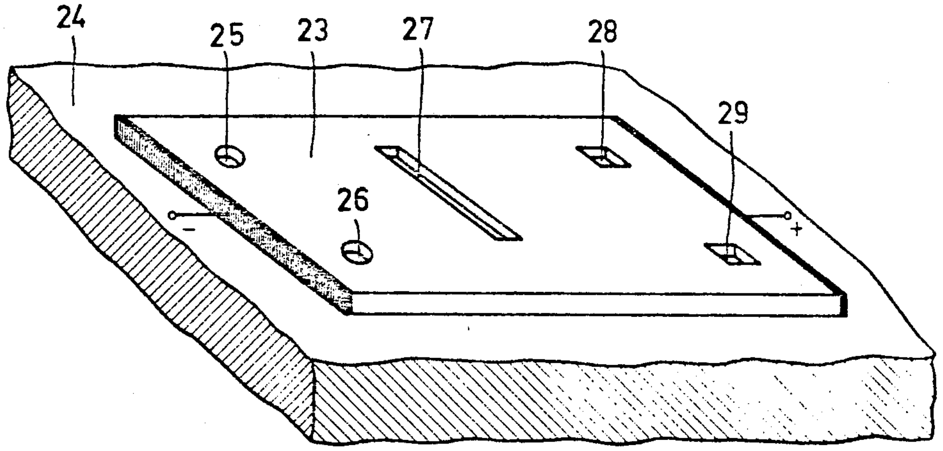
FIG. 4 is a perspective view yet another embodiment of a Gunn-effect device according to the present invention, the same being adapted for use as a logic circuit.

In the embodiment of FIG. 4, the active layer of the semiconductor body 23 is applied epitaxially on a heat sink 24, the leads representing the cathode and anode being indicated by minus and plus signs. The layer has two recesses 25 and 26 near the cathode. If the semiconductor body 23 is operated below the critical field strength and if this field strength is exceeded only when suitable signals are applied simultaneously via the recesses 25 and 26, the device functions as a logic circuit operating as an AND-circuit. The output signals can be divided by means of additional recesses 28 and 29, the same being suitably configured, i.e., positioned, dimensioned and/or contacted. A fifth recess 27, which is located between the cathode and anode allows part of the high field zone which is propagating through the semiconductor body, or which is being built up therein, to be coupled out. In this way, there is obtained a logic circuit having a very short response time which is, in fact, shorter than the transit time of the high field zone through the entire semiconductor body to the anode. In the LSA mode, the number of ways in which the oscillation can be controlled is increased, and this, in turn, increases the useful applications of the device.

Figure 5:
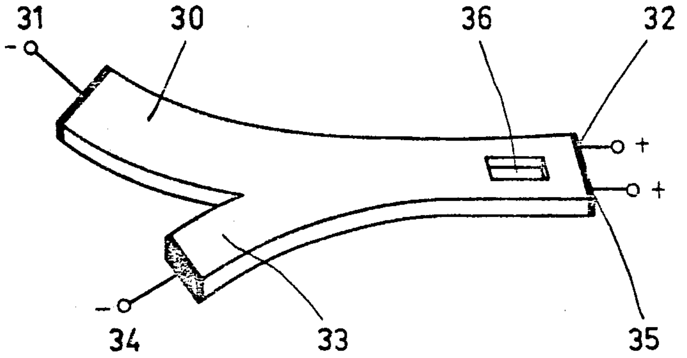
FIG. 5 is a perspective view of still another embodiment of a Gunn-effect device according to the present invention, the same including a bifurcated element.

In the embodiment of FIG. 5, the semiconductor body is bifurcated, the main portion joining two end portions 30, 33, whose end faces are provided with cathodes 31, 34, respectively, there being at the end of the main portion two anodes 32, 35, which are insulated from each other. While, in the interests of simplicity, the entire semiconductor body is shown as having a constant thickness, the same can have different thicknesses at different places and can, moreover, be bent throughout at least part of its length. If the device is so dimensioned that the two parts serve simultaneously as oscillators, the mixture of the frequencies can be taken off at the recess 36. If a part of the device is to act as an amplifier, the recess 36 can be dimensioned so as to make it possible to take out an amplified signal which, as explained above, can be rectified by means of a PN-layer.

Figure 6:
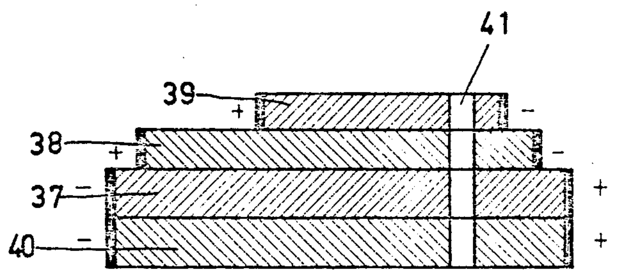
FIG. 6 is a sectional view of a still further embodiment of a Gunn-effect device according to the present invention, the same being adapted for frequency multiplying, converting, dividing or for delaying an input signal.

The embodiment of FIG. 6 is particularly suited for frequency multiplying, converting, dividing or delaying the input signal. The device shown in FIG. 6 incorporates a plurality of semiconductor bodies 37, 38, 39, 40, which are stacked into a single device, there being at least one recess 41 which passes through the stack so that the recesses in the semiconductor bodies are in alignment. If the two semiconductor bodies 37, 38, are to be used as oscillators, for example simultaneously, the semiconductor body 38 which is driven below the critical field strength can be triggered by coupling via the recess 41. Depending on the frequencies involved, there can be obtained a frequency conversion, depending on the critical length of the material or its doping. The device can, moreover, be used as a transit time delay element; this can be done by tapping all of the frequencies which are produced, whereupon the preferably pulse-shaped input signal applied to semiconductor body 40 is multiplied, depending on the number of subsequent semiconductor elements 37, 38, the manner in which they are connected, and the specifics of the recess.

The semiconductor body 39 is likewise coupled to at least one of the other semiconductors by way of the illustrated recess, or by another recess, or by a contacted recess. The semiconductor body 39 can, for example, be so dimensioned that it acts as an amplifier.

According to a further feature of the present invention, the semiconductor body can be so arranged that an ohmic coating which is fashioned as an electrode forms at least part of the wall of a wave guide, a tank circuit or an antenna; in the latter case, the second electrode which is part of the device serves simultaneously as a radiating element, with the high frequency radiofrequency energy being coupled in and/or out by way of the recess.

The device can be manufactured by not applying the active layer at suitable places so that the recesses will be formed during the manufacture. Alternatively, the recesses can be formed after the active layer has been completed; this can be done, for example, by means of laser beams.

Dimensioning of a semiconductor to act as an amplifier or oscillator is taught for example by Heinlein in Electronics Letters Vol. 2, Nov. 66, pages 417–418. The following are illustrative and not limitative examples of the present invention:

EXAMPLE 1

A semiconductor body having the configuration shown in FIG. 1*a* and made of N-type gallium arsenide has a length $l$=100$\mu$a width $w$=100$\mu$and a height $h$=50$\mu$. the recess 4 has the following dimensions: $A$=$B$=40$\mu$$C$=80$\mu$$D$=$E$=$H$=10$\mu$ $G$=30$\mu$$F$=20$\mu$. The recess 4 extends throughout the entire width $w$ of the semiconductor body. Without a recess 4, the wave shape was found to be flat. When a DC voltage is applied across anode and cathode whose electric field strength exceeds the critical value for the semiconductor the output current has a complex shape similar to that depicted in FIG. 1*b*. This "fixed" waveform between the pulses 5 and 6 has a slope of amplitude like the shape of the cross section of the semiconductor which is tapered by the recess 4. Another recess means another waveform. Similar apparatus for generating those fixed waveforms is described by Engelbrecht in Bell Laboratories Record, June 1967 on page 196.

EXAMPLE 2

A semiconductor body with the configuration of FIG. 3 made of N-type gallium arsenide with one internal contact and one external contact serves as a concentric planar diode. The inner contact with a radius of 50$\mu$ serves as the cathode; the outer contact is the anode and has a radius of 100$\mu$. The epitaxial active layer was 8$\mu$ in thickness. The frequency of this concentric diode is tunable by the applied DC voltage.

The concentric configuration makes it easy to use this diode in concentric lines.

It will be understood that the above description of the present invention is susceptible to various modifications, changes and adaptations.

I claim:

1. A Gunn-effect device comprising: a III–V–semiconductor body having an active layer provided with anode and cathode means at opposite ends thereof; at least two holes extending through said active layer for influencing a high field zone of said active layer, said holes being adjacent said cathode means and being at right angles to the direction of drift of charge carriers in said active layer; and means for contacting said holes so as to form signal input means for the input of information bearing signals which affect the critical nature of the high field within said device whereby, by the application of suitable signals to said signal input means, said device can function as a logic circuit.

2. A device as defined in claim 1 wherein said anode and cathode means form a field within said active layer which is less than the critical field; and wherein the signals applied to said signal input means are dimensioned so that only the simultaneous application thereof will cause said critical field to be exceeded, whereby said device functions as an AND gate.

* * * * *